Jan. 25, 1949.  J. VAN DER HEEM  2,459,977
STABILIZED POWER SUPPLY
Filed Dec. 18, 1946
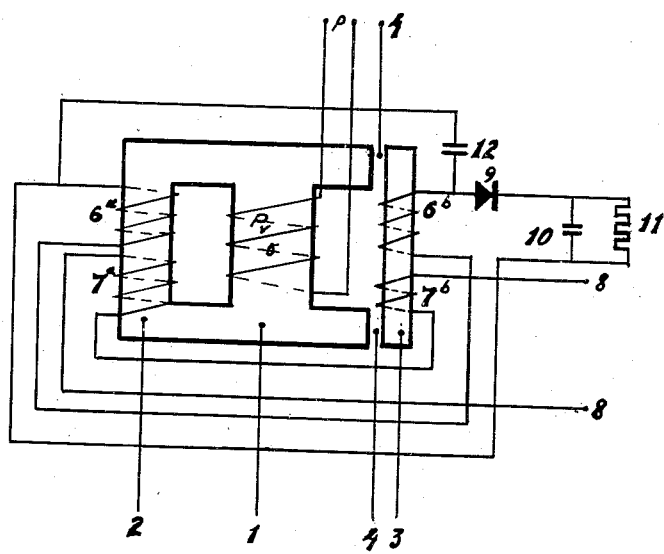
INVENTOR.
JAN VAN DER HEEM
BY
AGENT Patented Jan. 25, 1949

2,459,977

UNITED STATES PATENT OFFICE 2,459,977

STABILIZED POWER SUPPLY

Jan van der Heem, The Hague, Netherlands, assignor to Hartford National Bank and Trust Company, Hartford, Conn., as trustee Application December 18, 1946, Serial No. 716,966
In the Netherlands June 3, 1944

Section 1, Public Law 690, August 8, 1946
Patent expires June 3, 1964

2 Claims. (Cl. 171—97)

This invention relates to a device for stabilising the voltage supplied by a monophase rectifier, that is to say for making the said voltage independent of not undue variations, if any, of the mains voltage (for example variations up to 15–20% of the nominal value). The rectifier is fed by means of a transformer of the following construction. The transformer is of the shell type whose intermediate limb carries the primary winding, whereas the secondary winding is divided into two parts, each of which is provided on a side-limb of the transformer. The parts of the secondary winding are connected in opposition so that the secondary voltage is equal to the difference between the voltages produced in the two parts. One of the side-limbs of the transformer is separated from the remaining part of the magnetic circuit by means of an air-gap. The operation of this transformer is as follows. That side-limb which is not separated from the magnetic circuit by an air-gap is strongly saturated so that the voltage in the winding located on that side-limb varies less strongly than the primary voltage. That side-limb which is separated from the magnetic circuit by the air-gap is not saturated and consequently the voltage in the winding located on that side-limb varies in proportion to the primary voltage. Now, by a correct proportioning of the two parts of the secondary winding and adjustment of the air-gap it may be ensured that the secondary voltage remains substantially constant at least within a certain region of variation of the primary voltage.

The device described has a highly satisfactory operation with an ohmic load on the secondary winding and also when loaded by a doublephase rectifier. When the secondary winding is loaded by a monophase rectifier, however, the stabilising action appears to be largely neutralized, especially for any secondary windings other than the supply winding for the rectifier. This is probably due to the asymmetric load caused by the monophase rectifier, as a result of which the voltage curve is greatly deformed.

According to the invention, the stabilising action of the device may be restored completely by connecting a condenser of appropriate value in parallel with either the secondary winding, or with one of its parts. This step has the effect of preventing any undue deformation of the voltage curve, the device operating again as if a purely ohmic load were present. As an additional advantage we may mention that the efficiency of the device is improved by the use of the circuit according to the invention.

The invention will be described more fully with reference to the accompanying drawing showing diagrammatically an executional example of a device according thereto.

Reference numeral 1 denotes the intermediate limb of the transformer, which carries the primary winding 5. The side-limb 2 of the transformer is firmly coupled to the magnetic circuit, whereas the side-limb 3 is separated from this circuit by the air-gap 4. The secondary windings 6 and 7 are divided into two parts 6a, 7a and 6b, 7b which are provided on the limbs 2 and 3 respectively. The parts of the secondary windings are connected in opposition. The winding 7 may be connected to the load via the terminals 8. The winding 6 is loaded by a monophase rectifier 9 which supplies a direct-current voltage via a load resistance 11, bridged by a smoothing condenser 10. Now, in order to be able to maintain substantially constancy of the voltages across the load resistance 11 and between the terminals 8, the winding 6 feeding the rectifier is shunted by a condenser 12 of appropriate value.

It has been found that in numerous cases it also suffices to connect a condenser in parallel with one of the parts of the winding 6 feeding the rectifier.

What I claim is:

1. In a power supply system, the combination comprising an alternating-current transformer including a magnetic core having three leg portions, a primary winding surrounding the intermediate leg portion, a first pair of windings surrounding one side leg portion and a second pair of windings surrounding the other side leg portion, one of said side leg portions being separated from said intermediate leg portion by an air gap, one of said windings in said first pair being connected in series opposition with one of said windings in said second pair to constitute a first secondary winding, the other winding in said first pair being connected in series opposition with the other winding in said second pair to constitute a second secondary winding, a first load coupled to said first secondary winding, a second load including a half wave rectifying device, said second load being coupled to said second secondary winding, and a condenser shunted across said second secondary winding to equalize the loads imposed on said first and second secondary windings, thereby stabilizing the output voltages of said first and second secondary windings.

2. In a power supply system, the combination comprising an alternating-current transformer including a magnetic core having three leg portions, a primary winding surrounding the intermediate leg portion, a first pair of windings surrounding one side leg portion and a second pair of windings surrounding the other side leg portion, one of said side leg portions being separated from said intermediate leg portion by an air gap, one of said windings in said first pair being connected in series opposition with one of said windings in said pair to constitute a first secondary winding, the other winding in said first pair being connected in series opposition with the other winding in said second pair to constitute a second secondary winding, a first load coupled to said first secondary winding, a second load including a half wave rectifying device, said second load being coupled to said second secondary winding, and a condenser shunted across one of the two windings constituting said second secondary winding to equalize the loads imposed on said first and second secondary windings, thereby stabilizing the output voltages of said first and second secondary windings.

JAN van der HEEM.

REFERENCES CITED

The following references are of record in the file of this patent:

UNITED STATES PATENTS

| Number | Name | Date |
|---|---|---|
| 1,724,968 | Schelleng | Aug. 20, 1929 |